3,145,953
AIRCRAFT
Ralph Murch Denning and Alan Michael Lewis, Bristol, England, assignors to Bristol Siddeley Engines Limited, Bristol, England, a British company
Filed June 29, 1962, Ser. No. 206,233
Claims priority, application Great Britain July 6, 1961
13 Claims. (Cl. 244—76)

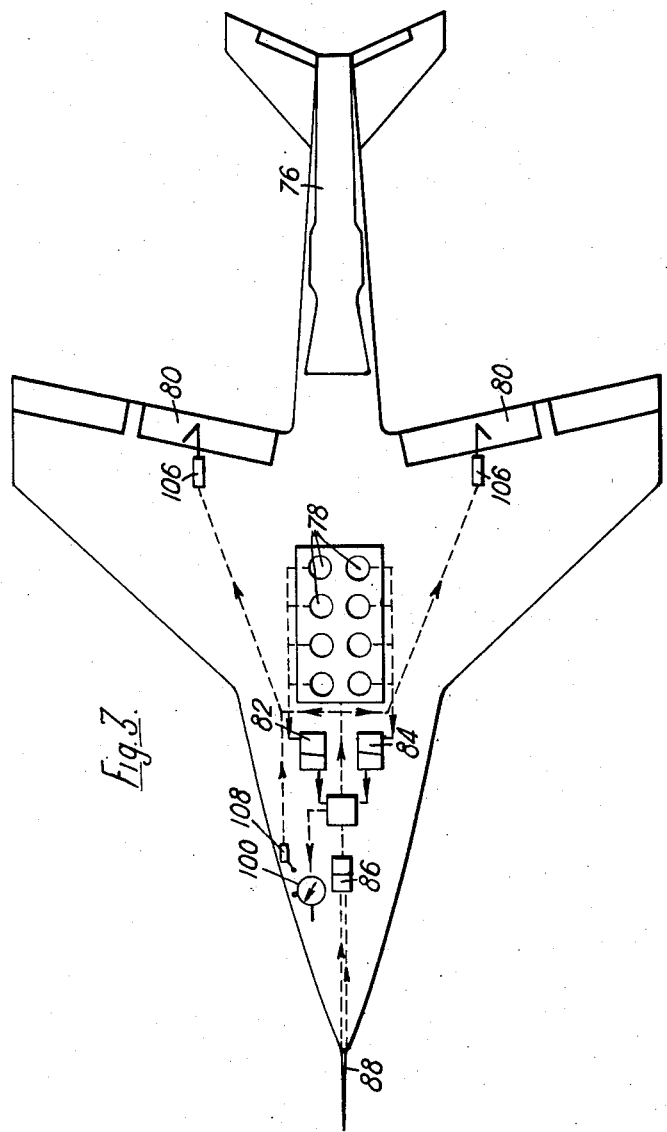

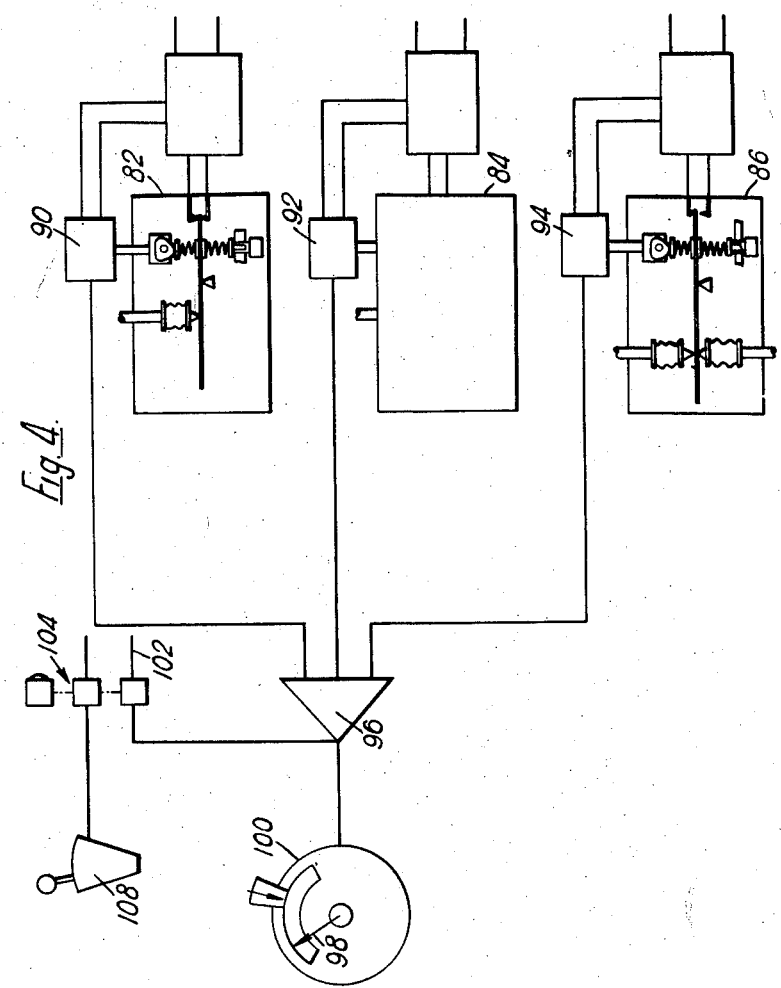

This invention relates to aircraft which for take-off under at least certain conditions—such as take-off at the maximum all-up weight of the aircraft—employ both aerodynamic lift generated by their forward motion and thrust lift generated by downwards discharge of propulsive fluid, and wherein, at the end of a short ground run, an operation is required to be performed to increase the lift sufficiently for a safe take-off. That is to say, the aircraft includes propulsion means, a wing for generating lift in response to forward motion of the aircraft, jet means for exerting a thrust having a lift component, and means for increasing lift by modification of the action of at least one of the wing and the jet means.

According to the present invention, such an aircraft includes first detecting means responsive to the air speed of the aircraft, second detecting means responsive to the thrust of the jet means, and output means for distinguishing, prior to the said modification of action, between safe and unsafe conditions for initiating the modification, by receiving signals from the detecting means, weighting those signals by predetermined quantities and deriving from the weighted signals an indication of the sum of the potential lift of the wing and of the jet means corresponding to the said modification, and comparing that indication with a predetermined datum indication of the lift necessary for safe take-off of the aircraft.

The means for increasing lift may be under control of the pilot, in which case the output means may be connected to and actuate an indicator to which the pilot can refer. Alternatively, the means for increasing lift may be connected to and actuated by the output means, and thus be automatically controlled. In the same aircraft there may be provision for both types of control with provision for changing over from one type to the other as desired at the option of the pilot.

The jet means may include at least one jet nozzle rotatable between a position in which it discharges rearwards and a position in which it discharges downwards, and the means for increasing lift may include means for rotating the nozzle. The jet means may be supplied with propulsion fluid, either air or exhaust gas, by the propulsion means. Alternatively the jet means may be independent of the propulsion means. For example there may be at least one short-period-rated lift engine connected to the jet means which is directed downwards, and at least one continuously-rated propulsion engine with non-lifting jet means associated with it and directed rearwards.

The accompanying drawings show examples of aircraft according to the present invention. In these drawings:

FIGURES 3 and 4 are diagrams similar to FIGURES 1 and 2, of a second aircraft.

Figure 1:
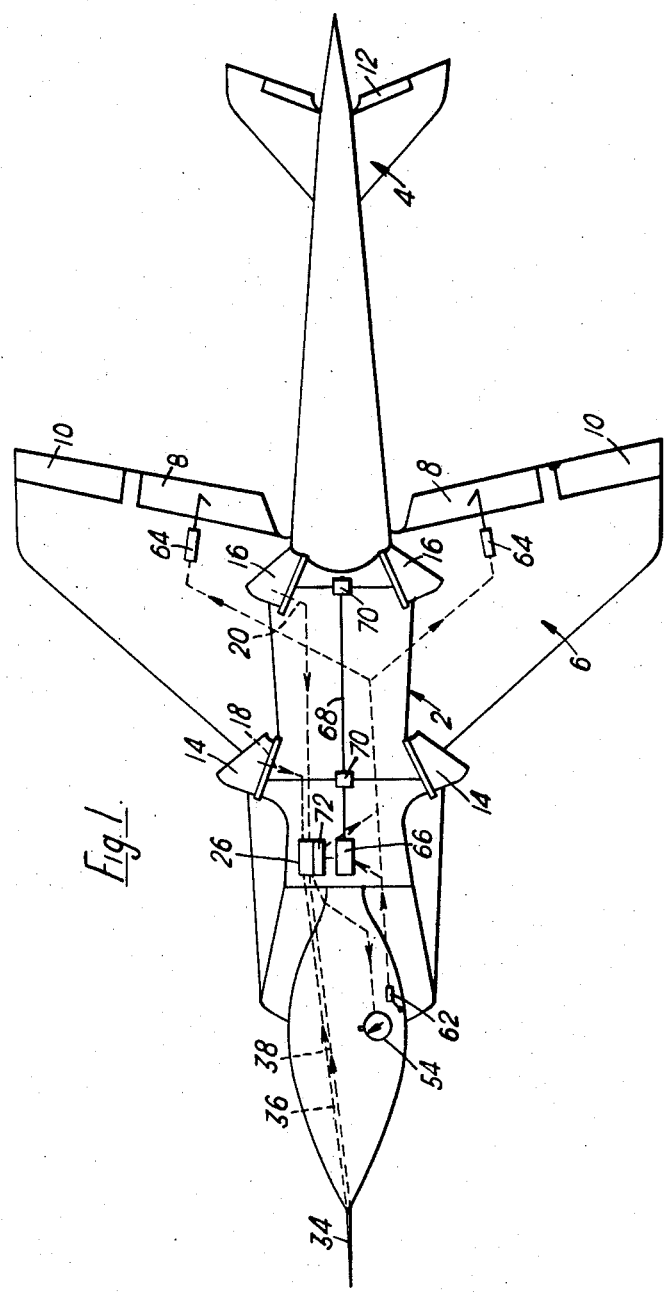
FIGURE 1 is a diagrammatic view of one aircraft from below.

The aircraft shown in FIGURE 1 has a jet propulsion system with directionally-controlled propulsion nozzles which permits the aircraft to take off either vertically or after a relatively short run, depending on the aircraft weight and effective engine thrust.

The aircraft comprises a fuselage which houses a gas turbine jet propulsion engine 2 adjacent to the centre of gravity of the aircraft, a tail unit 4, and a relatively small wing 6 equipped with trailing edge flaps 8 for increasing the aerodynamic lift of the wing. The wing and tail unit may be provided with the usual pivotable control surfaces 10, 12. The engine is provided with two pairs of propulsion nozzles of pipe bend form, one pair 14 being forward and the other pair 16 aft of the aircraft centre of gravity, and the nozzles projecting from the sides of the fuselage and being rotatable between positions in which they discharge rearwards for forward thrust and positions in which they discharge downwards for thrust lift, i.e. up thrust. The front nozzles 14 are fed with some of the air compressed by a ducted fan driven by the engine and the rear nozzles 16 are fed with the turbine exhaust gas from the engine by means of a forked jet pipe.

The wing area is sufficient to generate enough aerodynamic lift at cruising flight to support the aircraft, but is insufficient to generate enough lift by itself at take-off speed to permit take-off. The total lifting thrust produced by the engine with all four nozzles directed vertically downwards is insufficient to permit a vertical take-off when the aircraft is at its all-up weight, but if the wing lift which results from a short take-off run is augmented by lowering the wing flaps 8 and is combined with the thrust lift from the downwardly directed jet nozzles 14, 16 the total lifting force exerted on the aircraft will then so exceed the all-up weight of the aircraft that a safe take-off will be possible.

Since a take-off run is required when the aircraft is at its maximum all-up weight, the nozzles 14, 16 must initially be directed rearwards to give the required forward thrust to accelerate the aircraft to a sufficient forward speed. Consequently, in order to avoid a possible premature attempt at take-off during the take-off run, and also to avoid an unnecessary length of run, it must be known when it is safe to rotate the nozzles downwards, e.g. to about a 75° inclination from the horizontal (fore-and-aft) direction, and also to lower the flaps 8, so as to take off. This will depend on the effective thrust from the engine, but the thrust is dependent on such variables as ambient temperature and pressure and engine performance. Accordingly the pilot is provided with the following monitoring system which indicates visually to him when he may safely take off.

Figure 2:
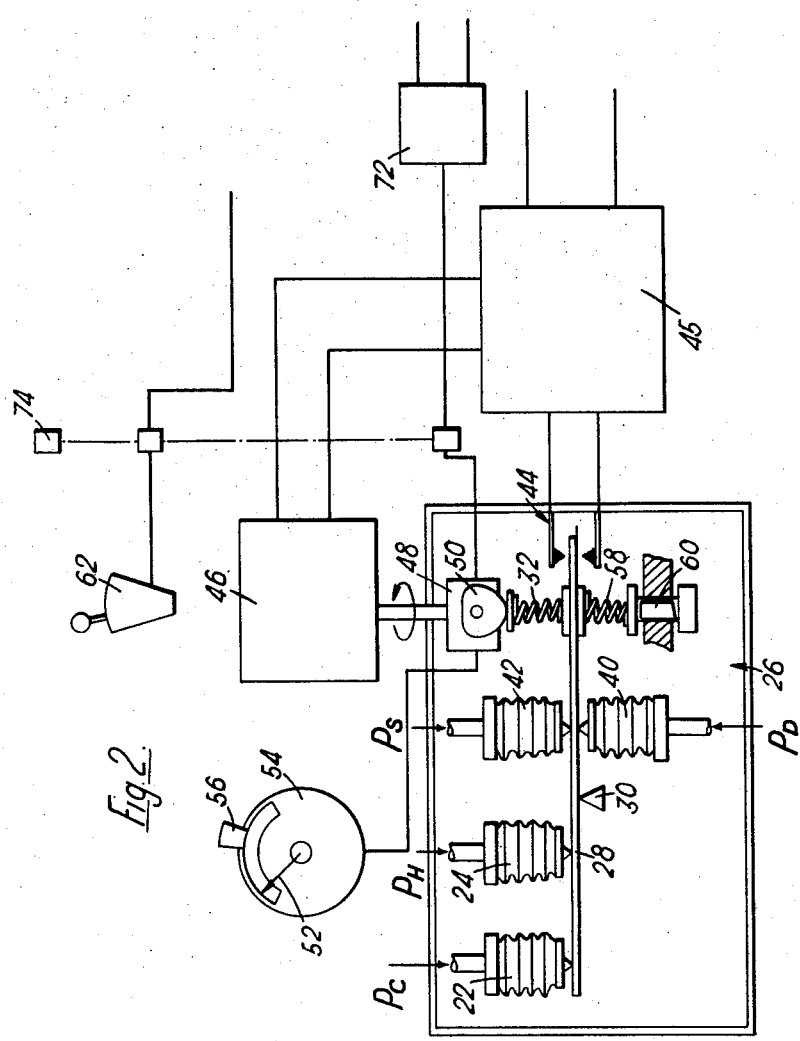
FIGURE 2 is a diagram of part of the monitoring system in the aircraft.

To measure the thrust developed by the engine, and hence the potential thrust lift for a predetermined downward inclination of the nozzles, tappings 18 and 20 are made from inside one of the two fan air nozzles 14, and from inside one of the two exhaust gas nozzles 16, and the pressures from the tappings are applied to the interior of capsules 22 and 24 respectively (FIGURE 2). These capsules form part of a pressure balancing system indicated by the rectangular outline 26 in FIGURE 1, and shown in detail in FIGURE 2. In FIGURE 2 the application of the pressures from the two tappings is indicated by the symbols $P_C$ (i.e. pressure of cold air) and $P_H$ (i.e. pressure of hot gas). These two pressures are each a function of the effective thrust of the corresponding pair of nozzles, and quantities proportional to the pressures are added together by causing the free ends of the capsules 22 and 24 to bear against the rocking lever 28 pivoted on a fixed pivot 30. These pressures, together with pressures representing the potential wing lift with flaps 8 lowered are balanced against a spring 32, as described below.

The potential wing lift of the aircraft is a function of its air speed, and, to measure the air speed, tappings are made of the dynamic and static pressures from a Pitot head 34. These tappings are connected by two pipes 36 and 38 to the pressure balancing system 26 and are there connected to capsules 40 and 42 respectively, the connections being indicated by the symbols $P_D$ (dynamic pressure) and $P_S$ (static pressure). The two capsules 40 and 42 act on opposite sides of the lever 28, so that the spring 32 opposes the sum of three quantities, namely:

Pressure in front nozzle tapping multiplied by a first constant,

Pressure in rear nozzle tapping multiplied by a second constant, and

Difference between dynamic and static Pitot head pressures multiplied by a third constant.

The first and second constants are predetermined weightings chosen to take account of the sizes of the nozzles and the expected conditions of the discharge gases, and also to take account of the angle to which the nozzles are to be turned for take-off and the fact that there are two nozzles of each kind. The third a predetermined weighting chosen to take account of the characteristics of the wing, and the position into which the flaps are to be moved for take-off. Each constant is a product of capsule area and the lever arm.

Because the pressures supplied to the capsules constitute signals which are substantially linearly related to the aerodynamic lift or to the nozzle thrusts, as the case may be, it is possible to combine the effects of these signals by simple summation, to produce an indication directly in terms of combined potential lift.

As the aircraft is accelerated on its take-off run under forward thrust, the pressures in the nozzle tappings and in the Pitot head dynamic tapping increase, causing the lever 28 to tend to turn in an anti-clockwise direction, as seen in FIGURE 2. The right hand end of the lever lies between a pair of contacts 44 which, through a discriminator 45, control the forward and backward running of a motor 46, connected to a gear box 48. From this gear box drives are taken to a cam 50 which acts against the spring 32, and to a pointer 52 on an indicator 54 in the pilot's cockpit. The effect of this arrangement is that, so soon as the lever 28 begins to deflect from a neutral position in which both contacts 44 are open, the motor 46 drives the cam 50 in a direction which alters the stress in the spring 32 to restore the lever 28 to a neutral position. The angular position of the cam 50 is a function of the stress of the spring 32, and is thus a function of the total potential lift. The position of the pointer 52 is likewise a function of the total potential lift and the indicator 54 is graduated so as to show total potential lift.

The all-up weight of the aircraft is known, and when the pointer 52 reaches a position on the scale which corresponds to the total lift force required for take-off at this weight, the pilot knows that, if the flaps 8 are now lowered and the four nozzles 14, 16 rotated from their rearward inclination to a predetermined downward inclination, the resulting increased aerodynamic lift and the thrust lift will together exceed the aircraft weight by an amount calculated to ensure a take-off without fear of stalling due to insufficient lift.

During climb after take-off and until the wing generates sufficient lift to support the aircraft without the help of thrust lift from the nozzles, the indicator still serves to indicate the combined wing lift and thrust lift opposing the weight of the aircraft.

In practice, both aerodynamic lift and thrust lift may still be required for take-off over a limited range below the normal maximum all-up weight of the aircraft, especially where take-off is carried out in hot climates or at high altitudes. Accordingly the indicator 54 may be modified by rotatably mounting a preset ring on the indicator box, which ring supports a radial reference line 56. Before commencement of the take-off run, the ring is rotated until the reference line 56 occupies the position on the circular scale which corresponds to the force required to lift the aircraft for take-off at the aircraft weight concerned. When during the take-off run the pointer moves to coincide with the reference line, the pilot knows that he may then safely move the flaps and nozzles to their take-off positions and so take off.

Opposed to the spring 32 is a spring 58 engaging an abutment 60 which can be adjusted, to enable account to be taken of different engine operating conditions, and of possible changes in the angular settings to which the nozzles are turned downwards.

When the aircraft reaches the crusing speed, the indicator 54 may be used as an air speed indicator. This is done by closing valves, not shown, in the connections between the tappings 18, 20 and the capsules 22, 24 and by providing a suitable airspeed scale on the indicator.

The flaps 8, and nozzles 14, 16 can be controlled by a pilot-operated handle 62 which, as shown in FIGURE 1, is connected to servo motors 64 for operating the flaps 8, and a servo motor 66 for operating the nozzles through shafting 68 and gear boxes 70.

Alternatively, or in addition to operating the indicator 54, a monitoring system may be used to energise the servo motors automatically, so soon as the combined aerodynamic lift and potential thrust lift are sufficient to overcome the aircraft weight for safe take-off. FIGURE 2 shows diagrammatically a connection from the gear box 48 to a servo motor control 72, which is also shown in outline in FIGURE 1. FIGURE 2 shows a selector 74 by which the manual control 62 or the automatic control 72 may be made operative, at the choice of the pilot.

With this kind of aircraft, the design may be such that wing flap actuation for short take-off runs is not required, in which case the sole operation required immediately before actual take-off is a downward rotation of the nozzles.

If, however, the aircraft weight has been sufficiently reduced, the aircraft may of course take off vertically with all four nozzles directed vertically downwards, in which case the indicator is not employed.

The invention is also applicable to an aircraft having a wing and a jet propulsion system comprising at least one jet engine for forward propulsion and one or more jet lift engines for providing downward discharge of propulsion fluid and hence thrust lift, the aircraft being provided with flaps which may require to be operated during a take-off run in order to obtain extra lift needed for take-off.

FIGURES 3 and 4 show an example of this kind of aircraft. As shown in FIGURE 3, the aircraft has a single propulsion engine 76 discharging a propulsive jet rearwards and a battery of eight lift engines 78 discharging lift jets downwards. These lift engines are only operated during take-off and landing. The aircraft also has wing flaps 80 like those in FIGURE 1.

There are three separate pressure balancing devices 82, 84 and 86. The device 82 receives an average of the pressures from tappings in the port row of engines 78, the device 84 receives an average of the pressures from tappings in the starboard row of engines 78, and the device 86 receives dynamic and static pressures from a Pitot head 88. Each device includes a spring, cam, and motor, similar to the spring 32, cam 50 and motor 46, shown in FIGURE 2. Drives from three motors 90, 92 and 94 are taken to an adder 96 from which a drive is taken to a pointer 98 on an indicator 100, similar to the indicator 54 in FIGURE 2, and a second drive 102 is taken through a selector 104 to servo motors 106 for operating the flaps 80. There is also a manual control 108, connected through the selector 104 to the servo motors 106.

We claim:
1. An aircraft including propulsion means, a wing for generating lift in response to forward motion of the aircraft, jet means for exerting a thrust having a lift component, means for increasing lift for take-off after a short ground run by modification of the action of at least one of the wing and the jet means, first detecting means responsive to the air speed of the aircraft, second detecting means responsive to the thrust of the jet means, and output means for distinguishing, prior to the said modification of action, between safe and unsafe conditions for initiating the modification, by receiving signals from the detecting means, weighting those signals by predetermined quantities and deriving from the weighted signals an indication of the sum of the potential lift of the wing and of the jet means corresponding to the said modification, and comparing that indication with a predetermined datum indication of the lift necessary for safe take-off of the aircraft.

2. An aircraft according to claim 1 including a visual indicator connected to the output means for actuation thereby.

3. An aircraft according to claim 1 in which the means for increasing lift is connected to the output means for actuation thereby.

4. An aircraft according to claim 1 in which the means for increasing lift includes flaps on the wing.

5. An aircraft according to claim 1 in which the jet means includes at least one jet nozzle rotatable between a position in which it discharges rearwards and a position in which it discharges downwards, and the means for increasing lift includes means for rotating the nozzle.

6. An aircraft according to claim 1 in which the jet means is supplied with propulsion fluid by the propulsion means.

7. An aircraft according to claim 6 in which the propulsion means is a gas turbine jet propulsion engine and a ducted fan driven by the engine, and the jet means are two pairs of jet nozzles, one pair connected to receive compressed air from the ducted fan and the other pair connected to receive the exhaust gas from the engine.

8. An aircraft according to claim 1 in which the jet means is independent of the propulsion means.

9. An aircraft according to claim 1 in which the first and second detecting means respectively consist of a Pitot head with means responsive to the dynamic and static pressures at the Pitot head, and a tapping from within the jet means with means responsive to the fluid pressure at the tapping.

10. An aircraft according to claim 7 in which the second detecting means consists of at least two tappings, one within an air nozzle and one within a gas nozzle, and means responsive to pressures at the tappings.

11. An aircraft according to claim 1 including means for adjusting the datum magnitude value.

12. An aircraft according to claim 2 including an airspeed scale on the visual indicator, and means for cutting off the output means from the second detecting means.

13. In an aircraft having a wing for generating lift in response to forward motion of the aircraft, propulsion means for effecting said forward motion, jet means for exerting a thrust having a lift component, means for increasing lift for take-off after a short ground run by modification of the action of at least one of the wing and the jet means, first detecting means capable of giving signals, second detecting means capable of giving signals, and output means, the method of increasing said lift comprising the steps of communicating said first detecting means with the air through which the aircraft moves so that said first detecting means is responsive in proportion to the air speed of the aircraft, communicating said second detecting means with the thrust generated by said jet means so that said second detecting means is responsive in proportion to the force of said thrust, imposing signals from said detecting means upon said output means for distinguishing, prior to the said modification of action, between safe and unsafe conditions for initiating the modification, weighting said signals by predetermined quantities and deriving from the weighted signals an indication of the sum of the potential lift of the wing and of the jet means corresponding to the said modification, comparing that indication with a predetermined datum indication of the lift necessary for safe take-off of the aircraft, and then, if the two indications coincide operating said lift increasing means.

References Cited in the file of this patent
UNITED STATES PATENTS

| | | |
|---|---|---|
| 2,191,250 | Fischel | Feb. 20, 1940 |
| 2,737,015 | Wright | Mar. 6, 1956 |
| 2,930,544 | Howell | Mar. 29, 1960 |
| 2,941,399 | Bersinger | June 21, 1960 |
| 3,056,258 | Marchant et al. | Oct. 2, 1962 |
| 3,060,684 | Holmes | Oct. 30, 1962 |